United States Patent
Eliscu

(10) Patent No.: US 10,650,385 B1
(45) Date of Patent: May 12, 2020

(54) SYSTEM AND METHOD FOR REMOTE CHECK ASSURANCE

(71) Applicant: Viewpost, LLC, Maitland, FL (US)

(72) Inventor: Max Eliscu, Winter Park, FL (US)

(73) Assignee: VIEWPOST, LLC, Maitland, FL (US)

( * ) Notice: Subject to any disclaimer, the term of this patent is extended or adjusted under 35 U.S.C. 154(b) by 0 days.

(21) Appl. No.: 14/161,303

(22) Filed: Jan. 22, 2014

Related U.S. Application Data

(63) Continuation of application No. 13/647,117, filed on Oct. 8, 2012, now abandoned.

(51) Int. Cl.
  *G06Q 20/10* (2012.01)
  *G06Q 20/42* (2012.01)

(52) U.S. Cl.
  CPC ................... *G06Q 20/42* (2013.01)

(58) Field of Classification Search
  CPC ....... G06Q 20/42; G06Q 20/10; G06Q 20/405
  USPC ........................................................ 705/39
  See application file for complete search history.

(56) References Cited

U.S. PATENT DOCUMENTS

| | | | |
|---|---|---|---|
| 6,115,690 A | 9/2000 | Wong | |
| 7,113,925 B2 | 9/2006 | Waserstein et al. | |
| 7,539,646 B2 | 5/2009 | Gilder et al. | |
| 7,548,881 B2 | 6/2009 | Narayan et al. | |
| 7,644,037 B1 | 1/2010 | Ostrovsky | |
| 7,885,451 B1 | 2/2011 | Walls et al. | |
| 7,904,354 B2 | 3/2011 | Pepe et al. | |
| 8,126,809 B2 | 2/2012 | Buchanan et al. | |
| 8,165,381 B1 | 4/2012 | Ferris et al. | |
| 8,577,797 B1* | 11/2013 | Schuette | G06Q 40/02 235/380 |
| 8,583,546 B1* | 11/2013 | Schuette | G06Q 20/0425 705/35 |
| 2002/0055907 A1 | 5/2002 | Pater et al. | |
| 2003/0037002 A1 | 2/2003 | Higgins et al. | |
| 2003/0074315 A1 | 4/2003 | Lam | |

(Continued)

FOREIGN PATENT DOCUMENTS

| WO | WO-96/24997 | 8/1996 |
|---|---|---|
| WO | WO-01/50307 | 7/2001 |

OTHER PUBLICATIONS

Ahuluwalia et al., "Target-Based Database Sychronization", University of Maryland Baltimore County, Mar. 2010.*

(Continued)

*Primary Examiner* — Hai Tran
(74) *Attorney, Agent, or Firm* — Foley & Lardner LLP

(57) ABSTRACT

Before providing goods or services, a party being paid (the "payee") wants assurances that the party paying (the "payor") will in fact provide payment. Such assurances are even more important when the payee is using a payment method other than cash currency. A method described includes receiving for a transaction between a payor and a payee, via a computer network, payor and payee information and transaction information; receiving from an electronic device an indication for payment for the transaction, wherein the indication includes a type of payment and a transaction amount; communicating payor and payee information, transaction amount, and type of payment to a payor bank; receiving from the payor bank a notification of assurance associated with a check for payment for the transaction; and communicating to the payee that payment for the transaction is assured.

9 Claims, 5 Drawing Sheets

(56) References Cited

U.S. PATENT DOCUMENTS

| | | |
|---|---|---|
| 2003/0115155 A1 | 6/2003 | Doran |
| 2003/0233321 A1 | 12/2003 | Scolini et al. |
| 2004/0117305 A1 | 6/2004 | Meier et al. |
| 2004/0133516 A1 | 7/2004 | Buchanan et al. |
| 2004/0172360 A1 | 9/2004 | Mabrey et al. |
| 2005/0108153 A1 | 5/2005 | Thomas et al. |
| 2005/0131780 A1 | 6/2005 | Princen |
| 2005/0283437 A1 | 12/2005 | McRae et al. |
| 2006/0095374 A1 | 5/2006 | Lo et al. |
| 2006/0212391 A1 | 9/2006 | Norman et al. |
| 2006/0237526 A1 | 10/2006 | Mueller et al. |
| 2006/0277129 A1 | 12/2006 | Johnston et al. |
| 2007/0276674 A1 | 11/2007 | Hemmat |
| 2007/0288382 A1 | 12/2007 | Narayanan et al. |
| 2008/0027853 A1 | 1/2008 | Neubert |
| 2008/0097899 A1 | 4/2008 | Jackson et al. |
| 2008/0201254 A1 | 8/2008 | Sharma et al. |
| 2008/0247629 A1 | 10/2008 | Gilder et al. |
| 2008/0262953 A1 | 10/2008 | Anderson et al. |
| 2008/0262954 A1 | 10/2008 | Nally |
| 2008/0270293 A1 | 10/2008 | Fortune et al. |
| 2008/0275774 A1 | 11/2008 | Pepe et al. |
| 2008/0294508 A1 | 11/2008 | Alan |
| 2009/0018889 A1 | 1/2009 | Petersen et al. |
| 2009/0094148 A1 | 4/2009 | Gilder et al. |
| 2009/0187482 A1 | 7/2009 | Blount et al. |
| 2009/0292641 A1 | 11/2009 | Weiss |
| 2010/0082443 A1 | 4/2010 | Folk et al. |
| 2010/0161466 A1 | 6/2010 | Gilder |
| 2010/0262522 A1 | 10/2010 | Anderson et al. |
| 2010/0274729 A1 | 10/2010 | Holm et al. |
| 2010/0281300 A1 | 11/2010 | Richardson et al. |
| 2010/0293066 A1 | 11/2010 | Kimi et al. |
| 2010/0318369 A1 | 12/2010 | Nambiar et al. |
| 2010/0332391 A1 | 12/2010 | Khan |
| 2011/0015974 A1 | 1/2011 | Zafrir |
| 2011/0112967 A1 | 5/2011 | Anderson et al. |
| 2011/0231295 A1 | 9/2011 | McMonagle et al. |
| 2011/0251965 A1 | 10/2011 | Holm et al. |
| 2011/0270749 A1 | 11/2011 | Bennett et al. |
| 2011/0313920 A1 | 12/2011 | Trickel |
| 2012/0030115 A1 | 2/2012 | Peace et al. |
| 2012/0036065 A1 | 2/2012 | Orttung et al. |
| 2012/0130899 A1 | 5/2012 | McMonagle et al. |
| 2012/0158558 A1 | 6/2012 | Hahn-Carlson et al. |
| 2012/0197675 A1 | 8/2012 | Waldron et al. |
| 2012/0223134 A1 | 9/2012 | Smith et al. |
| 2012/0259716 A1 | 10/2012 | Rosenberger |
| 2013/0066777 A1 | 3/2013 | Richards |
| 2013/0097076 A1* | 4/2013 | Love ................. G06Q 20/0425 705/42 |
| 2013/0117183 A1 | 5/2013 | Bozeman |
| 2013/0212008 A1 | 8/2013 | Edwards et al. |
| 2014/0012813 A1 | 1/2014 | Oh et al. |
| 2014/0019217 A1 | 1/2014 | Eliscu |
| 2014/0019346 A1 | 1/2014 | Eliscu |

OTHER PUBLICATIONS

U.S. Appl. No. 13/592,847, filed Aug. 23, 2012, Max Eliscu.
Final Office Action on U.S. Appl. No. 13/546,743, dated Jul. 3, 2013.
Final Office Action on U.S. Appl. No. 13/592,847, dated Mar. 26, 2013.
Final Office Action on U.S. Appl. No. 13/647,117, dated Jan. 7, 2014.
Final Rejection on U.S. Appl. No. 13/546,769, dated May 3, 2013.
Final Rejection on U.S. Appl. No. 13/647,117, dated May 13, 2013.
Non-Final Office Action on U.S. Appl. No. 13/546,743, dated Dec. 18, 2012.
Non-Final Office Action on U.S. Appl. No. 13/546,769, dated Nov. 26, 2013.
Non-Final Office Action on U.S. Appl. No. 13/546,769, dated Dec. 12, 2012.
Non-Final Office Action on U.S. Appl. No. 13/592,847, dated Nov. 27, 2012.
Non-Final Office Action on U.S. Appl. No. 13/546,699, dated Jun. 5, 2013.
Non-Final Office Action on U.S. Appl. No. 13/647,117, dated Jan. 3, 2013.
Robertson, David, "Credit where credit's due," Engineering Village, Jul./Aug. 2005, pp. 58-59.
Tan Xue and Zhang Hongmin, "The Mechanism Design for Credit Sales Risk Management of the Enterprise," 2010 IEEE Conference on Management and Service Science (MASS), Harbin University of Commerce, Harbin, China, Aug. 24, 2010, 3 pages.
Final Office Action on U.S. Appl. No. 13/546,769, dated May 21, 2014.
Notice of Allowance on U.S. Appl. No. 13/546,699, dated May 8, 2014.
Non-Final Office Action on U.S. Appl. No. 14/313,560, dated Jan. 14, 2015.
Non-Final Office Action on U.S. Appl. No. 13/546,743, dated Mar. 12, 2015.
Non-Final Office Action on U.S. Appl. No. 13/546,769, dated Oct. 20, 2015; 15 pages.
USPTO Final Office Action issued in U.S. Appl. No. 13/546,743 dated Dec. 18, 2015; 19 pages.
USPTO Final Office action issued in U.S. Appl. No. 13/546,769 dated Jul. 15, 2016; 22 pages.
USPTO Non-final Office Action issued in U.S. Appl. No. 14/313,560 dated Apr. 21, 2016; 18 pages.
USPTO Non-final Office Action issued in U.S. Appl. No. 14/161,299 dated Nov. 3, 2016.
Ahluwalia et al.; "Target-Based Database Synchronization"; University of Maryland Baltimore County; pp. 1643-1647 (Mar. 2010).
USPTO Advisory Action issued in U.S. Appl. No. 13/546,769 dated Nov. 9, 2016.
USPTO Final Office Action issued in U.S. Appl. No. 14/313,560 dated Dec. 29, 2016.
USPTO Non-final Office Action issued in U.S. Appl. No. 13/546,743 dated Jan. 12, 2017.
USPTO Non-final Office Action issued in U.S. Appl. No. 13/546,769 dated Dec. 28, 2016.
USPTO Non-final Office Action issued in U.S. Appl. No. 14/161,299 dated Jul. 25, 2016.
Final Office Action for U.S. Appl. No. 13/546,743 dated Jul. 27, 2017, 38 pages.
U.S. Office Action dated Jun. 20, 2017 from related U.S. Appl. No. 13/546,769, 28 pages.
Non-Final Office Action in U.S. Appl. No. 13/546,769 dated Jan. 19, 2018, 29 pages.
Non-Final Office Action issued in U.S. Appl. No. 14/313,560 dated Nov. 1, 2017, 20 pages.
Non-Final Office Action issued in U.S. Appl. No. 14/161,299 dated Dec. 8, 2017, 18 pages.
Final Office Action issued in U.S. Appl. No. 14/161,299 dated Jun. 12, 2018, 31 pages.
Final Office Action issued in U.S. Appl. No. 14/313,560 dated May 2, 2018, 21 pages.
Non-Final Office Action issued in U.S. Appl. No. 13/546,743 dated Jun. 28, 2018, 70 pages.
Final Office Action on U.S. Appl. No. 13/546,743 dated May 2, 2019.

* cited by examiner

Fig. 4A

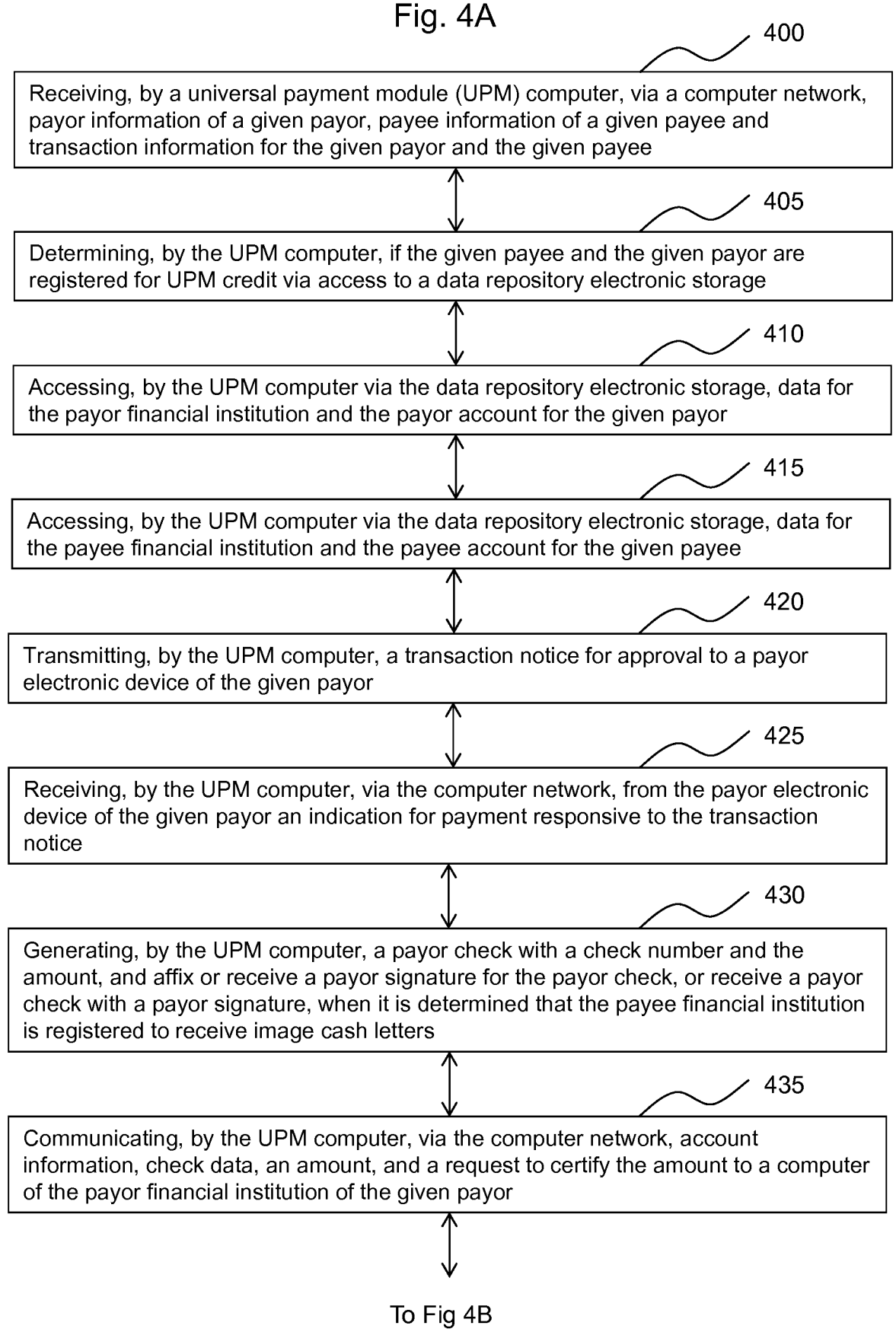

400 — Receiving, by a universal payment module (UPM) computer, via a computer network, payor information of a given payor, payee information of a given payee and transaction information for the given payor and the given payee 405 — Determining, by the UPM computer, if the given payee and the given payor are registered for UPM credit via access to a data repository electronic storage 410 — Accessing, by the UPM computer via the data repository electronic storage, data for the payor financial institution and the payor account for the given payor 415 — Accessing, by the UPM computer via the data repository electronic storage, data for the payee financial institution and the payee account for the given payee 420 — Transmitting, by the UPM computer, a transaction notice for approval to a payor electronic device of the given payor 425 — Receiving, by the UPM computer, via the computer network, from the payor electronic device of the given payor an indication for payment responsive to the transaction notice 430 — Generating, by the UPM computer, a payor check with a check number and the amount, and affix or receive a payor signature for the payor check, or receive a payor check with a payor signature, when it is determined that the payee financial institution is registered to receive image cash letters 435 — Communicating, by the UPM computer, via the computer network, account information, check data, an amount, and a request to certify the amount to a computer of the payor financial institution of the given payor To Fig 4B

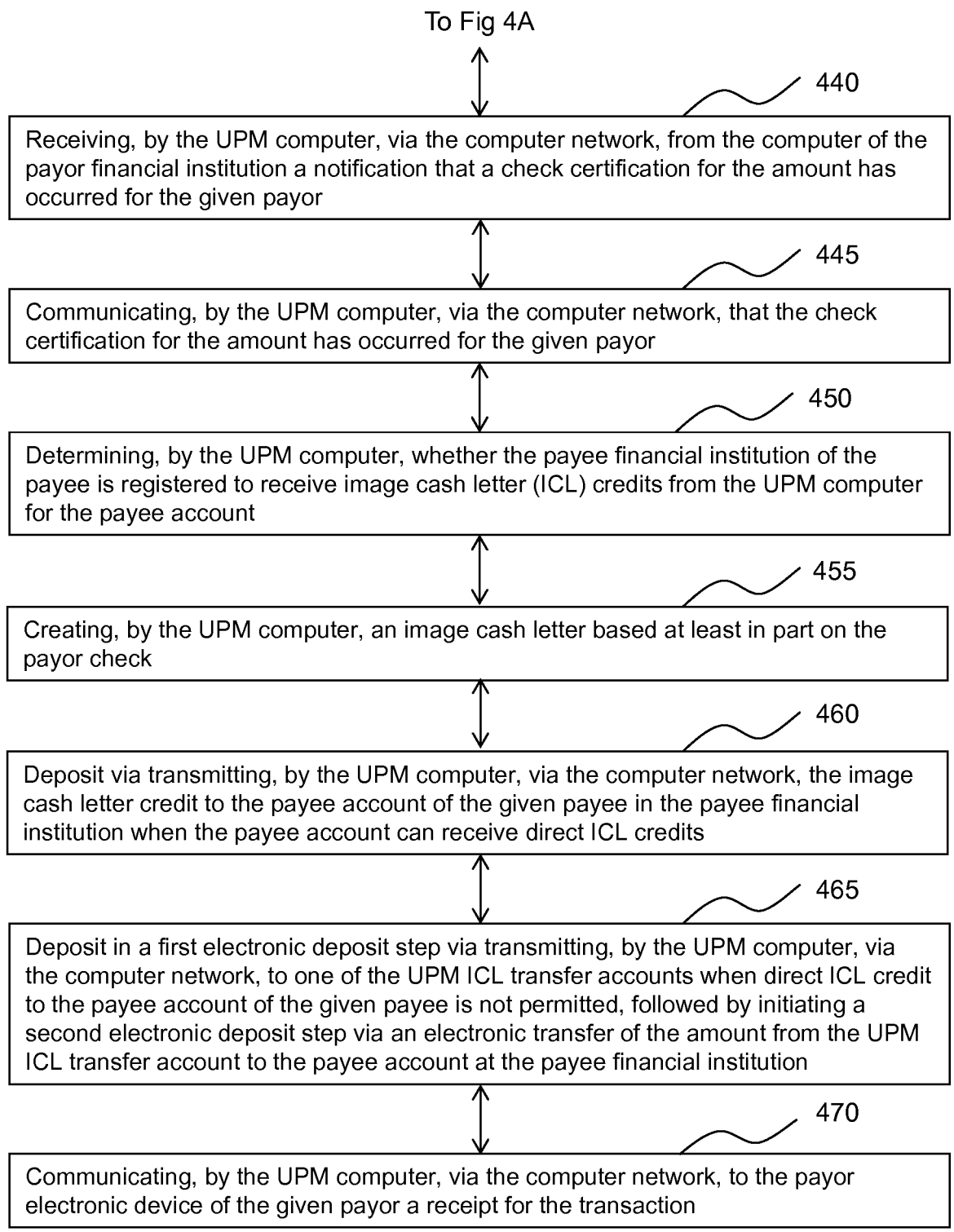

SYSTEM AND METHOD FOR REMOTE CHECK ASSURANCE

CROSS REFERENCE TO RELATED APPLICATIONS

The present application is a continuation of U.S. patent application Ser. No. 13/647,117 entitled "SYSTEM AND METHOD FOR REMOTE CHECK ASSURANCE" filed on Oct. 8, 2012, which is related to U.S. patent application Ser. No. 13/546,699 entitled "UNIVERSAL PAYMENT MODULE AND SYSTEM" filed on Jul. 11, 2012; U.S. patent application Ser. No. 13/546,743 entitled "UNIVERSAL SYSTEM FOR ELECTRONIC CHECK CREATION AND PAYMENT VIA IMAGE CASH LETTER" filed on Jul. 11, 2012; U.S. patent application Ser. No. 13/546,769 entitled "UNIVERSAL SYSTEM FOR ENABLING DYNAMICALLY DISCOUNTED BUYER-VENDOR PAYMENTS" filed on Jul. 11, 2012; and U.S. patent application Ser. No. 13/592,847 entitled "POINT OF SALE CHECK CERTIFICATION PROCESS AND SYSTEM" filed on Aug. 23, 2012. These applications are incorporated herein by reference.

SUMMARY

Assurance or guarantee of payment is important to commercial transactions. Before providing goods or services, a party being paid (the "payee") wants assurances that it will in fact be paid by the paying party (the "payor"). Such assurances are even more important when the payee is using a payment method other than cash currency. For example, some merchants do not accept payment by personal check for fear that the funds in the checking account will be insufficient to cover the payment or even that the check is in some manner fraudulent. Issuers of payment cards, such as credit, charge, and debit cards, attempt to provide payees with assurances that they will receive payment. These assurances help give the payee comfort that payment will be received. However, the card issuers provide these assurances in exchange for a very high price, in most cases, a percentage fee paid on every transaction, among other charges associated with clearance of the transaction.

The systems and methods described herein provide payees with an assurance or guarantee that payment will be made for a transaction while eliminating the high cost of accepting payment via payment card transactions such as credit, charge, or debit card transactions. In an example implementation of the systems and methods disclosed herein, a remote check assurance system and method facilitate payment by check including assurances associated with a certified check, cashier's check, or teller's check. The system and method identify a user payor and obtain an amount requested to be paid to a payee and information on what account should be used. The system and method then processes payment using a negotiable instrument determined by the instructions of the user and the merchant/receiver of payment.

Example negotiable instruments for the implementations described herein can be, for example, certified checks, cashier's checks, or teller's checks. In the context of a certified check, the bank on which the check is drawn (where "bank," as used herein, refers to any form of depository institution at which checking or similar transactional accounts can be maintained) certifies that it will pay the draft when presented based on available funds in the checking account at the time of certification, but the check remains drawn on a payor account. In some implementations using certified checks, the bank transfers funds from the payor account and places them in a segregated funds account, waiting for the check to be presented. In the context of a cashier's check or a teller's check, a bank debits funds from the payor account and receives the funds into an account of the bank. The bank then issues a cashier's check or causes a teller's check to be issued, which are obligations of the bank itself, not the payor. Regardless whether a certified check, cashier's check, or teller's check is used, the effect is the payee receiving an assurance or guarantee of payment by the bank.

In an example implementation, a bank is a registered user of a universal payment module that enables the bank to electronically create a check or cashier's check made out to a merchant or payee in the amount of a transaction. The check or cashier's check is delivered by the universal payment module for deposit to the merchant's account.

The implementations of the systems and methods described herein enable assured payment from a payor to a payee either by certified check or cashier's check from a remote location. In contrast, traditional processes for certified checks are manual and require the payee to be present in person at a bank. In the case of a certified check, the payor writes a personal check to the payee (e.g., a merchant) and requests that it be certified. An authorized bank representative looks to the payor's account, and if sufficient funds are present in the account, does a memo post, or actually removes funds from the account in the amount of the check, often placing the same in a segregated funds account. The bank representative then stamps the check with a certification label and signs it on behalf of the bank. In the case of a cashier's check, or other official check, the payor visits a bank branch, generally bringing identification, and completes a form identifying the amount of the check desired and the payee. The payor may or may not be a customer of the bank. If not a customer of the bank, the payor can bring cash into the bank and give the same to the banker. The banker then accepts the form and the cash, and creates its own check, made out to the payee. If the payor is a customer of the bank, the bank will accept the instructions and use the funds (debiting them) in the payor's account to support the creation of the official/cashier's check. The check is drawn on the account of the bank and is guaranteed to be honored by the bank when the merchant or payee presents the check for payment. The payor can then take the check and give it to the payee, who can take it to his/her bank for expedited funds availability. The payor may engage in a similar check-request process electronically through a bank's website.

In instances of both the certified check and the cashier's check, traditional processes are entirely manual, and generally require the customer to visit the branch and meet with a bank employee. Moreover, 100% of the time, the outcome is a physical instrument (either the original check with a certification stamp or an official/cashier's check). The payor then has to deliver it to the payee, who has to deposit with his/her bank, or bring it to the payor's bank, which will exchange the check for cash.

Advantageously, the implementations of the systems and methods described herein permit a payor to electronically create a check that is electronically certified through a process using a universal payment module. The bank on which the check is drawn certifies the check and provides notification of the certification electronically to a universal payment module. The universal payment module completes the payment process.

In an example implementation of the systems and methods involving an official check or a cashier's check, the payor can create a check, drawn on its account, in the amount of the transaction, and payable to the bank. The bank can receive same, along with a request to issue a cashier's/official check. Assuming there are sufficient funds in the user's account, the bank debits same, and creates a cashier's/official check made out to the payee. The cashier's check can be created using the universal payment module, which then would deliver it to the payee account. The cashier's check can also be physically created and sent directly from the bank to the merchant. If the payee's bank is the same as the payor's bank, the bank can deposit the check to the payee's account using account information for the payee provided by the universal payment module. In yet another alternative, the bank can post the funds to the payee's account, referencing the cashier's/official check.

One aspect of the implementations described herein is the ability to request certification of checks electronically. In an example implementation, a certified check can be delivered, via a network, to the payee, or back to the payor for future delivery to the payee. In another implementation, the system enables users to request official/cashier's checks electronically, for the bank to receive those requests, along with customer identification and account information, as well as payee information. The system then allows the bank to have sufficient data to issue the official/cashier's check, and in one implementation, to produce the check via the system, and for the system to receive the check, on the payor's behalf, depositing same into the account of the payee. In another implementation, the check is printed and mailed to the payee. In still another implementation, where the payee's preferred deposit account is at the bank that has been required to issue the official/cashier's check, because the account information is known to the system, in addition to the check information, the system obtains the account information, and the transaction amount can be debited from the account of the payor, and credited to the account of the payee. In another implementation using the above fact pattern related to an "on-us" transaction, in addition to the payee account information, a deposit slip for the payee can be provided electronically, and the official/cashier's check can be created and immediately deposited into the account of the payee, all, without the need for a customer/user to visit a branch, for the bank to print a check and for the payor to receive the check and delivery it to the payee. The above can be done in seconds, so there is also no need to ever obtain a certified check, or official/cashier's check in advance of a transaction.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims. Like reference numbers and designations in the various drawings indicate like elements.

FIG. 4A is a block diagram of an embodiment of a process consistent with the invention.

FIG. 4B is a continuation of FIG. 4A.

DETAILED DESCRIPTION

A universal payment module (UPM) can be implemented using a combination of computer hardware and software.

The UPM can be configured to enable a payment system used by merchants and other payees to provide assurances or guarantees of payment for transactions. These assurances or guarantees can be achieved through the use of negotiable instruments whose payment is guaranteed by the bank on which they are drawn. Ultimate payment can also be guaranteed by a guarantor. A bank, financial institution, or other third party communicates with the UPM to provide, or cause to be provided, a certified check, a cashier's check, a teller's check, or some other type of guaranteed payment in response to a request from the UPM including payor and transaction information.

Figure 1:
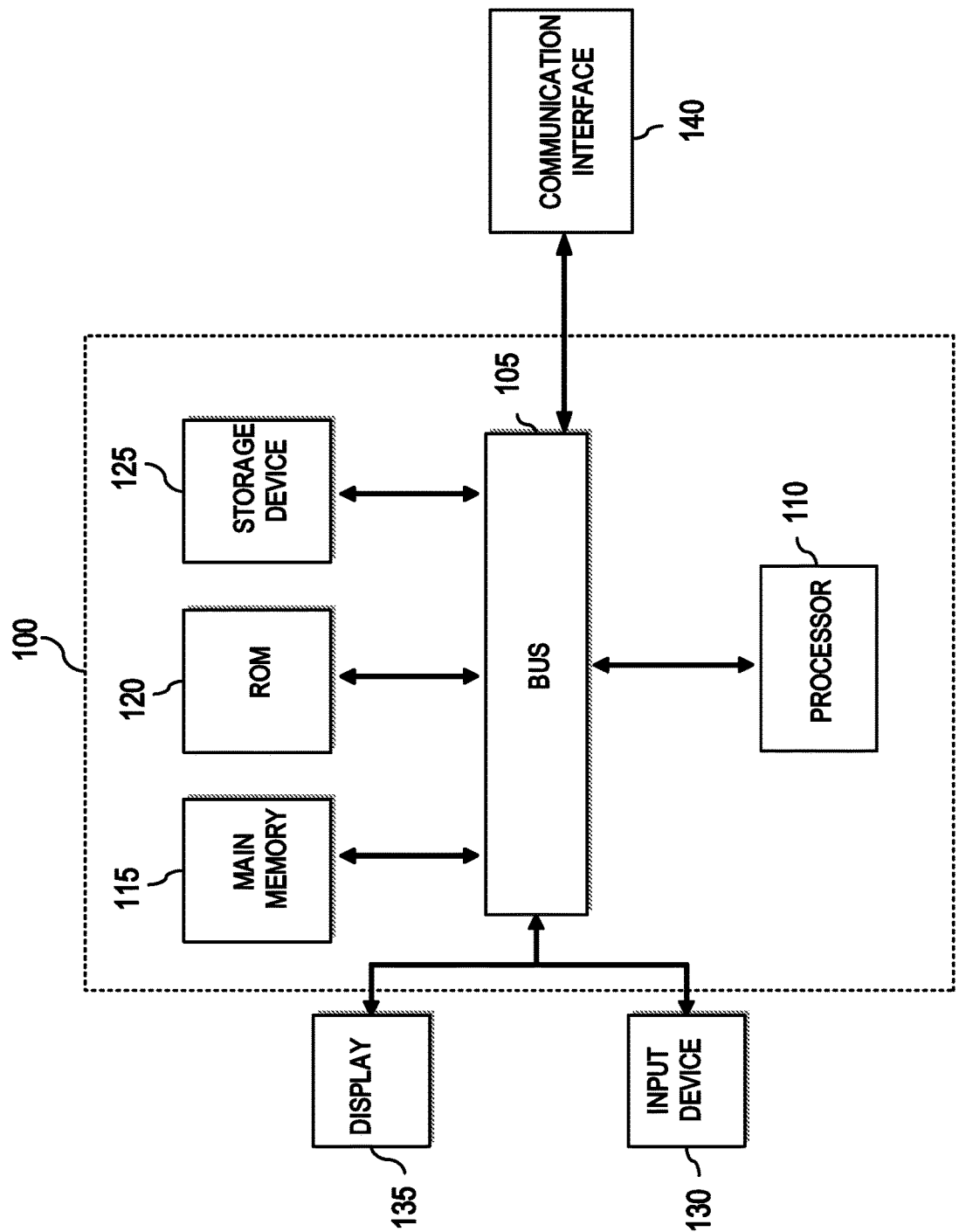
FIG. 1 is a block diagram of a computer system in accordance with an illustrative implementation.

FIG. 1 illustrates a block diagram of a computer system in accordance with an illustrative implementation. The computer system or computing device 100 can be used to implement a universal payment module (UPM). The computing system 100 includes a bus 105 or other communication component for communicating information and a processor 110 or processing circuit coupled to the bus 105 for processing information. The computing system 100 can also include one or more processors 110 or processing circuits coupled to the bus for processing information. The computing system 100 also includes main memory 115, such as a random access memory (RAM) or other dynamic storage device, coupled to the bus 105 for storing information, and instructions to be executed by the processor 110. Main memory 115 can also be used for storing position information, temporary variables, or other intermediate information during execution of instructions by the processor 110. The computing system 100 may further include a read only memory (ROM) 110 or other static storage device coupled to the bus 105 for storing static information and instructions for the processor 110. A storage device 125, such as a solid state device, magnetic disk or optical disk, is coupled to the bus 105 for persistently storing information and instructions.

The computing system 100 may be coupled via the bus 105 to a display 135, such as a liquid crystal display, or active matrix display, for displaying information to a user. An input device 130, such as a keyboard including alphanumeric and other keys, may be coupled to the bus 105 for communicating information and command selections to the processor 110. In another implementation, the input device 130 has a touch screen display 135. The input device 130 can include a cursor control, such as a mouse, a trackball, or cursor direction keys, for communicating direction information and command selections to the processor 110 and for controlling cursor movement on the display 135. The computing system 100 may communicate with other computing systems, such as via a network or a network of networks (such as the Internet), via a communication interface 140. In some implementations of the computing system 100, the communication interface 140 may be part of the bus 105.

According to various implementations, the processes described herein can be implemented by the computing system 100 in response to the processor 110 executing an arrangement of instructions contained in main memory 115. Such instructions can be read into main memory 115 from another computer-readable medium, such as the storage device 125. Execution of the arrangement of instructions contained in main memory 115 causes the computing system 100 to perform the illustrative processes described herein. One or more processors in a multi-processing arrangement may also be employed to execute the instructions contained in main memory 115.

An example payment method employed by the UPM involves receiving information regarding a transaction between a payor and a payee, communicating information about the payor, the payee and the transaction to payor's bank or other financial institution, receiving back from the payor's bank or other financial institution an assurance of payment (in the form of a notification to certify the check or to use a cashier's check drawn from the payor's bank), and processing payment for the transaction with payee's bank.

Figure 2:
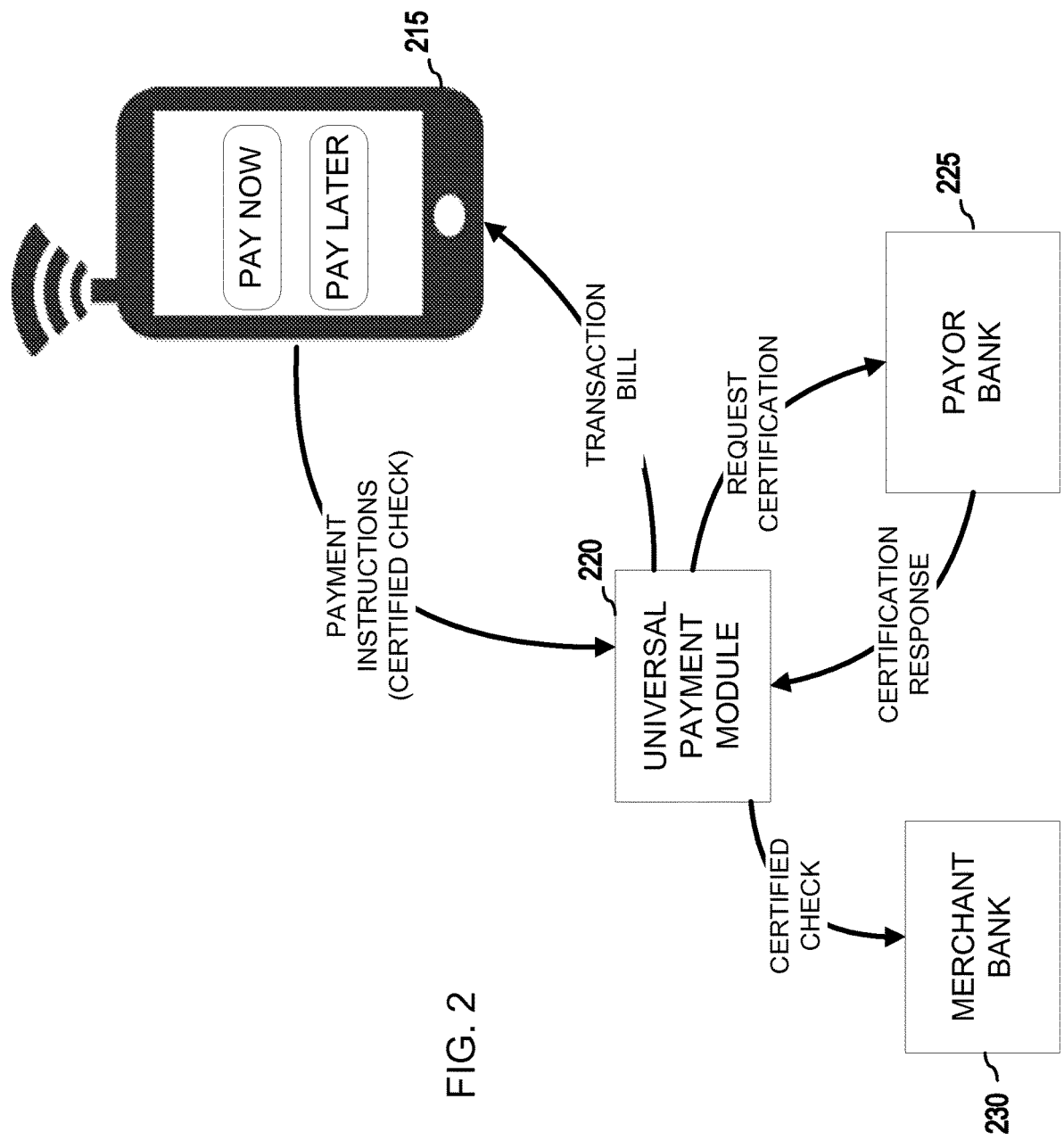
FIG. 2 is a depiction of a remote check assurance system in accordance with an illustrative implementation.

FIG. 2 illustrates an illustrative implementation of remote check assurance. In the illustrative implementation, a universal payment module (UPM) 220 transmits a transaction bill to a smart phone device 215 where a payor can review the transaction details. The payee can transmit the transaction bill to the UPM 220 for communication to the payor or even directly to the payor. The payor operating the smart phone 215 communicates payment instructions to the UPM 220. The payment instructions include information about who the payor is, what financial account and institution the payor wants to use for the transaction, the transaction amount, and the identity of the payee. The customer can press "pay now" or "pay later" buttons on a display of the smart phone device 215. The "pay now" button results in a guaranteed payment instrument based on funds already in a checking account of the payor whereas the "pay later" button results in payment using funds transferred from a credit line or other funding source of the payor into the checking account of the payor prior to a determination of certification or assurance. The payment instructions from the smart phone device 215 can result in a request for check certification of a check drawn on the customer's checking account or the issuance of a bank cashier's check based on the customer's available credit line at the bank or elsewhere. Other accounts can be accessed for payment, such as a savings account or investment account. The user can select the type of payment instrument or it may be a requirement of the merchant, or a preference or requirement of the bank.

The UPM 220 then communicates the account information (including, e.g., the checking account or the credit line) and the transaction amount to a payor bank 225. As discussed above, the payor bank 225 can be a customer's bank. In some embodiments, the payor bank is associated with an insurance company, a third party guarantor, or any financial institution, depending on the particular type of assurance desired by the payor and/or required by the payee. The payor bank 225 returns a response to the assurance request to the universal payment module 220. In the case of a certification from the payor bank 225, the bank 225 sends instructions to the UPM 220 to annotate a check to denote it as certified. If assurance, such as certification is obtained, the UPM 220 communicates to the payee (at a point-of-sale device or at a payee electronic device) that the transaction can be completed. The UPM 220 delivers the payment check to a merchant bank 230 for deposit into the account of the payee. The certified check can be delivered electronically. Alternatively, an image cash letter can be sent to the merchant bank 230 for processing of payment.

The illustrative implementation described above assumes the assurance provider is a bank and that payment is made by certified check. However, in other implementations, a credit line provider can be an insurance company or a guarantee company. In such an implementation, the transaction payment amount is communicated by the universal payment module 220 to a non-bank credit provider. This non-bank credit provider can facilitate the certification of a check or the issuance of a cashier's or teller's check in a variety of ways. First, the non-bank credit provider can debit the customer's credit line and cause to be created a certified check or cashier's check using the universal payment module 220 in the amount of the customer's check for deposit to the customer's bank account and be delivered to the customer's bank via the UPM 220, ensuring that the customer's bank account has adequate funds with which to permit certification of the customer's check. In another implementation, the credit provider can offer a guaranty of payment to the customer's bank and the customer's bank can opt to provide assurance based on the guarantee of payment provided by the credit provider and/or funding of the customer's account by the credit provider. In yet another implementation, where the customer selects the "pay later" option, the UPM 220 sends a message to the non-bank credit provider requesting that the credit provider create a check drawn on its own bank account in the amount of a bill. The non-bank credit provider then creates a check using the UPM 220 in the amount of the bill and drawn on the non-bank credit provider's bank account, referencing the bill via a unique transaction identifier provided by the payee, and uses the UPM 220 to obtain certification of the non-bank credit provider's check. The check would be payable to the merchant, and upon certification of the check, it would be electronically delivered to the UPM 220 (as described above) (or funds delivered via an ICL process), for ultimate deposit to the payee's account. The credit provider would, prior to check creation, review the customer's available credit and upon creation of the check, allocate the check amount against the customer's credit line.

According to an example implementation, confirmation of the certification process may go to the smart phone 215 via the UPM 220. Alternatively, a point-of-sale (POS) device is connected to the UPM 220 and communication of the certification confirmation is made to the POS device. For example, at the checkout of a retailer, at the POS terminal, there can be a user interface that provides as an option for payment the assurance process enabled by the universal payment module. That is, the user interface of the POS terminal can show tabs for debit, credit, and payment using the universal payment module (UPM). When the UPM is selected, the user enters identification and security credentials. In an example implementation, the user hands the teller a smart phone that displays a barcode or other type of identifier. The POS device user interface then shows a "pay now" button and a "pay later" button. Depending on the user's bank (or the requirement of the merchant), the UPM 220 will process a cashier's/teller's check or a certified check. If a cashier's check, the "pay now" functionality can prompt the user with a signature line on the user interface, or not, depending on bank requirements. The POS device communicates the information to the UPM which sends a notification that the user has signed to the bank and the process continues as described. If a certified check is used, when the user presses "pay now," a signature line may be presented. However, the user's signature may be on file with the universal payment module enabled system. When the signature is entered, a check is created by the universal payment module using the POS signature.

Alternatively, if the payor doesn't have a UPM-enabled phone, the payor can enter account identification information into a POS terminal. Alternatively, a phone can be equipped with Near Field technology to enable the POS terminal to identify the user in that way. Yet still another aspect of the implementation described with reference to FIG. 2 (and that described below with reference to FIG. 3) is that it enables the smart phone device 215 to perform functions of a personal checkbook that is accessed online. In such an online checkbook embodiment, a first individual submits instructions via the universal payment module 220 for payment to be made to a designated second individual, regardless of whether the first individual receives an invoice. The universal payment module 220 assures and delivers the check payment requested by the first individual to the bank 230 of the second individual. Payment to the bank 230 can be made via image cash letter (ICL) as described herein. Also, payment can be made to the bank 230 using the other mechanisms described herein.

Figure 3:
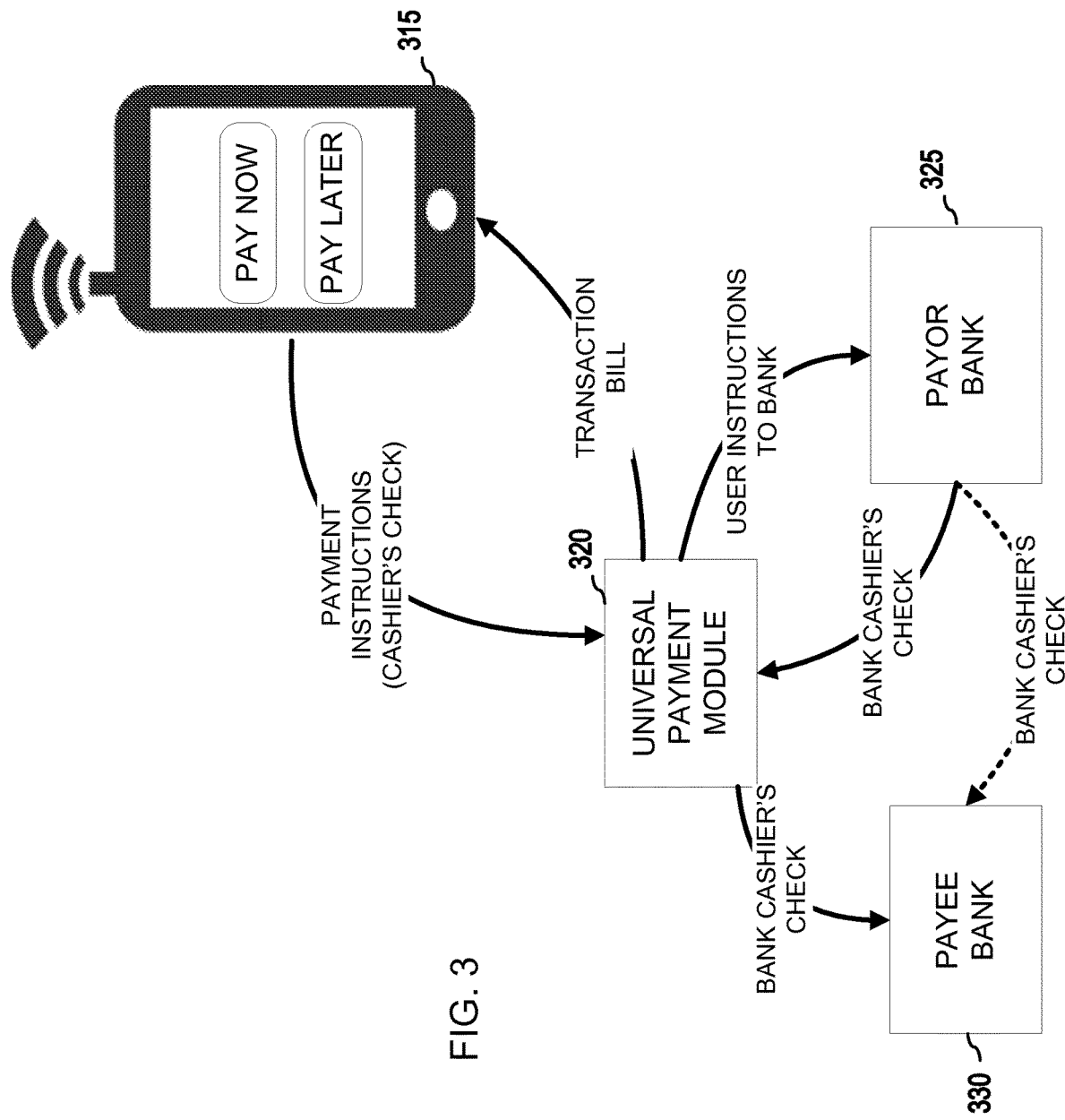
FIG. 3 is a depiction of a remote check assurance system in accordance with another illustrative implementation.

FIG. 3 illustrates another illustrative implementation of remote check assurance. In the illustrative implementation of FIG. 3, a universal payment module (UPM) 320 transmits a transaction bill to a smart phone device 315 where a payor can review the transaction details. The payor operating the smart phone 315 communicates payment instructions to the UPM 320. In the particular example of FIG. 3, the payor has requested payment be made using a cashier's check. As indicated previously, the user may select the type of payment instrument or the type of payment may be a requirement of the merchant, or a preference or requirement of the bank. In addition to the payment type, payment instructions include information about who the payor is, what financial account and institution the payor wants to use for the transaction, the transaction amount, and the identity of the payee. The UPM 320 sends user instructions to a payor bank 325. The payor bank 325 creates a cashier's check drawn from an account of the bank or uses the UPM to electronically create a check. The payor bank 325 may debit the customer's account when the cashier's check is created or the funds may be transferred later. The payor bank 325 communicates with the UPM 320 to instruct creation of a cashier's check. In one implementation, the cashier's check is sent from the payor bank 325 to a payee bank 330 for deposit in the payee's account. In another implementation, the payor bank 325 sends a communication to the UPM 320 for payment to be made via a cashier's check and the UPM 320 communicates the payment to the payee bank 330.

The payment to the payee bank 330 can also be made, as in one of the implementations described with reference to FIG. 2, using an image cash letter (ICL). Before an ICL deposit can be made directly to a payee's account, there must be an agreement with the payee's financial institution, or a third party institution that handles payments or provides other treasury or system support services for the merchant's bank, that allows the UPM 320 to deliver a customer's check to the payee's account. Using the payee's financial account information, the UPM 320 can determine if a payor to payee ICL deposit is possible. If such a direct ICL deposit is not possible, the UPM 320 can still facilitate the payment in an efficient manner. For example, in one implementation, the UPM 320, via a two-step process, can still reduce the amount of time for funds to be received compared to traditional ACH (Automated Clearing House) or credit card payment from payor to payee. The UPM 320 can first make an ICL deposit into an account associated with the UPM 320 at the payee's financial institution. The account associated with the UPM 320 is not the payee's account, but rather an account for "controlled, not owned" funds, maintained by the UPM 320. In this implementation, the check payment would be made in the name of an administrator or owner of the UPM 320, for the benefit of the payee, and the funds would be deposited into the account of the UPM administrator or owner or a designee at the payee's financial institution. This implementation includes the funds represented by the check payment being delivered to the payee's account via the account associated with the operator of UPM 320. The payor's payment is deposited into the UPM account, for the benefit of the payee, and is then transferred to the payee's account. In one implementation, the UPM 320 can initiate the transfer after the ICL has cleared. Alternatively, the UPM 320 may not wait for payment to clear before initiating a transfer to the payee's account. Because the UPM-associated account and the payee's account are with the same financial institution, the transfer can typically be handled more quickly than a transfer between two different financial institutions.

Referring to FIG. 4, an embodiment comprises block 400 for receiving, by a universal payment module (UPM) computer, via a computer network, payor information of a given payor, payee information of a given payee and transaction information for the given payor and the given payee; block 405 for determining, by the (UPM) computer, if the given payee and the given payor are registered for (UPM) credit via access to a data repository electronic storage; block 410 (UPM) for accessing, by the UPM computer via the data repository electronic storage, data for the payor financial institution and the payor account for the given payor; block 415, for accessing, by the UPM computer via the data repository electronic storage, data for the payee financial institution and the payee account for the given payee; block 420 for transmitting, by the (UPM) computer, a transaction notice for approval to a payor electronic device of the given payor; block 425 for receiving, by the (UPM) computer, via the computer network, from the payor electronic device of the given payor an indication for payment responsive to the transaction notice; block 430 for generating, by the (UPM) computer, a payor check with a check number and the amount, and affix or receive a payor signature for the payor check, or receive a payor check with a payor signature, when it is determined that the payee financial institution is registered to receive image cash letters; block 435 for communicating, by the (UPM) computer, via the computer network, account information, check data, an amount, and a request to certify the amount to a computer of the payor financial institution of the given payor; block 440, "receiving, by the (UPM) computer, via the computer network, from the computer of the payor financial institution a notification that a check certification for the amount has occurred for the given payor; block 445 for communicating, by the (UPM) computer, via the computer network, that the check certification for the amount has occurred for the given payor; block 450 for determining, by the (UPM) computer, whether the payee financial institution of the payee is registered to receive image cash letter (ICL) credits from the UPM computer for the payee account; block 455 for creating, by the (UPM) computer, an image cash letter based at least in part on the payor check; block 460 for depositing via transmitting, by the (UPM) computer, via the computer network, the image cash letter credit to the payee account of the given payee in the payee financial institution when the payee account can receive direct ICL credits; block 465 for depositing in a first electronic deposit step via transmitting, by the (UPM) computer, via the computer network, to one of the (UPM) ICL transfer accounts when direct ICL credit to the payee account of the given payee is not permitted, followed by initiating a second electronic deposit step via an electronic transfer of the amount from the UPM ICL transfer account to the payee account at the payee financial institution of the given payee; and block 470 for communicating, by the (UPM) computer, via the computer network, to the payor electronic device of the given payor a receipt for the transaction.

The systems and methods described enable payment assurances to be provided to a payee very quickly. Payment to the payee can be received within minutes or hours instead of the days typically associated with payment by check.

Moreover, the ability to create a certified check or a cashier's check at a location remote from a bank is distinctly unique from payment using a debit card. Payment using a debit card is delivered via an Automated Clearing House (ACH) process in a batch process that takes days to process. In stark contrast, the remote check assurance process described herein can obtain assurance of payment and process the payment in minutes and actually settle the transaction in only hours.

Accounting System Synchronization

When businesses reach a certain scale they often acquire accounting software to facilitate the production of their financial statements. There are hundreds, if not thousands, of options to choose from, and within those options, tens of thousands of versions. However, in many cases businesses opt to produce their financial statements by hand, or through the assistance of outside accounting personnel or consultants. The simple scale of options, and disparate processes within and across each, prevent businesses from easily interacting with one another in a highly efficient and automated fashion, as accounting platforms are not standardized, and even if they were, the lack of connectivity among and between them would prevent integration. The UPM-enabled system includes a connected network that is designed, among other things, to enable the easy integration and distribution of data among and between all businesses, regardless of the accounting or ERP software they have chosen, or even in circumstances where they use no accounting software at all. In some implementations, the UPM-enabled system can be used as the electronic accounting system for these small businesses. For companies that do use an electronic accounting system, the information contained within the electronic accounting system can be synchronized with the UPM-enabled system. For example, data representing vendor lists, buyer lists, receivables, payables, etc., can be integrated into the UPM-enabled system.

The accounting system synchronization can start with the company indicating the accounting system that is used by the company. Location information, such as where accounting data files, last used file, etc., are located, can be provided as needed. For example, the UPM-enabled system can determine and/or suggest a location or the user can browse and select the source location. Once the accounting system is identified, and data files located, the accounting data can be sent to the UPM-enabled system. After the accounting data is in the UPM-enabled system, the UPM data can be synchronized with the company's accounting system. As described in greater detail below, synchronization can be done in various ways. For example, synchronization can be done on express demand by the company. In another implementation, synchronization can occur automatically based upon a change in either the company's accounting system and/or the UPM. One advantage of syncing with the UPM-enabled system is that vendors are able to transmit invoice data (among other information) to all customers connected to the UPM-enabled system without any meaningful changes to the business processes already designed to uniquely maximize their internal efficiency. This feature is in contrast to circumstances where customers regularly dictate unique invoice and/or data delivery requirements to their vendors, requiring vendors to modify their business practices to accommodate these unique requirements. In many instances, these requirements can only be met by purchasing yet additional software unique to the requirements of a specific customer, and paying third party integrators to modify solutions.

In one implementation, a synchronization agent on one or more computing devices of the company can be used to send and receive data to/from the UPM-enabled system. For example, in the instance where both a buyer and vendor are connected to the UPM-enabled system, and each other on the UPM-enabled system, and both are utilizing syncing functionality, and the buyer is utilizing auto-syncing functionality (and after syncing if the buyer was not auto-syncing) to keep both its accounting system and/or ERP system in sync with the UPM-enabled system, the act of the buyer paying an invoice within its accounting or ERP system would instantaneously push payment data to the UPM that would be visible to the vendor. In addition, the UPM-enabled system would provide instantaneous notification to the devices preferred by the vendor (email, text, etc.) Upon confirmation of receipt of the payment, the vendor would need only indicate, on the UPM-enabled system, that the payment had been received, and a sync entry would be triggered, allowing the vendor to apply the payment within its accounting system without any data entry and without error. Further, since the UPM-enabled system can serve as a business process management system, in instances where a payment was received from a customer and a discrepancy existed, the vendor would be able to modify the application of the payment on the UPM-enabled system. For instance, if the customer made a payment in full, but took a credit for damages, or a perceived allowance, the vendor on the UPM-enabled system would be able to apply the "short payment" to the GL categories that existed (or create new ones that would be pushed into their accounting system) within the vendor's accounting or ERP system (same being visible on the UPM-enabled system), and upon satisfactory categorization of the payment on the UPM-enabled system, sync same down to their accounting or ERP system. All of this can be done from any internet connected device, at the click of a button, without any data entry. Using a synchronization agent allows a company to continue to use its existing accounting system while receiving the benefits of the UPM-enabled system. Thus, a company can use the UPM-enabled system without having to change internal procedures to accommodate or learn a new accounting system.

Advantageously, synchronization of accounting and ERP data with the UPM-enabled system, which serves as a network of businesses, allows each company to manage its relationships with all of its customers and vendors from the UPM-enabled system. More specifically, rather than managing fifteen different relationships with its customers using a combination of manual and integrated closed loop systems (buyer/vendor-specific), the same company would be able to manage all fifteen relationships within the UPM-enabled system, assuming the buyers were all connected to the UPM-enabled system. In one place, the vendor would be able to see the status of all open invoices from one location. Further, the vendor, who itself is likely a buyer, would also be able to manage its relationships with its vendors, and all without phone calls, data entry duplication or error, and all fully integrated. The UPM-enabled system, therefore, is far more than an invoice presentment solution used by a buyer to communicate invoice status to vendors. It is a network, or ecosystem, of fully integrated (data delivery, receipt, review, dispute, approval, payment and synchronization into disparate accounting platforms) relationships, which does not require third party integrators, expensive new platforms, new business processes across all customers and all vendors.

In one implementation, the synchronizing of data requires approval of the data that is to be synchronized. Changes to data in the UPM-enabled system and the company's accounting system can be noted, but not automatically synchronized. For example, a synchronization queue can be used to indicate the synchronizations that need to occur based upon changes to data. For example, a company can create a new invoice in the company's accounting system. The synchronization agent can send to the UPM-enabled system data that describes this new invoice. In this implementation, the UPM-enabled system does not synchronize this data with the company's accounting data on the UPM-enabled system. Rather, the UPM-enabled system indicates in the synchronization queue that the new invoice was created in the company's accounting system, has been identified by the synchronization agent and is available to be synchronized with the data in the UPM-enabled system. Data changes made to the UPM-enabled system's accounting data can also be shown in the synchronization queue. For example, a company may issue a credit memo from the UPM-enabled system to a vendor's account using the UPM's interface. This change can be shown in the synchronization queue, but will not be integrated into the customer's accounting system until the customer approved the sync, or turns on auto syncing capabilities. Nonetheless, the vendor would be made aware of the credit memo immediately upon creation by the customer. A customer can review the synchronization queue and select any of the data changes to sync. For example, a customer can select to synchronize all entries in the synchronization queue. Once selected, the selected queue entries can be synchronized between the UPM-enabled system and the company's accounting system.

In another implementation, data can automatically be synchronized as data changes in either the UPM-enabled system or the existing accounting system. In this implementation, when a change in made to any accounting data in one system, the change is sent to the other system. For example, if an invoice is changed in the existing accounting system, the change is sent and automatically synchronized with the data in the UPM-enabled system. The synchronization agent can send and receive data as described above. However, rather than needing express approval to synchronize data, the synchronization agent can sync received data with the company's existing accounting system as data is received. Similarly, the UPM-enabled system can synchronize its data when changes in the existing accounting system are received from the synchronization agent. Although not entirely eliminated in this implementation, data conflicts can be greatly reduced.

During synchronization, data conflicts can occur between various systems. For example, both a buyer and a vendor may change the same piece of data but to different values. Some changes, however, may not be material to a particular party. Because the accounting system data may have changes that are not material as far as the UPM is concerned, a hash of the fields that are material is computed, and compared to one generated from the UPM-enabled system's data to hide entries from the queue where only extraneous data has changed. The entry is still written to the UPM-enabled system, however, because the immaterial data may be required for display on an invoice or other document generated by the user. The data can be stored as a collection of name-value pairs that can be retrieved when needed. If the accounting package allows for it, the document layout itself can also be synced to and from the UPM-enabled system. A data collision can also occur between material data. For example, an amount of an invoice could be modified both in the user's accounting system, and in the UPM-enabled system, both to different amounts and both prior to the last sync (assuming auto syncing was not enabled). If both of these changes are synchronized, a data collision can occur since the same piece of data was changed to different values. The conflict can be resolved in a number of ways: the change from either the UPM-enabled system or the accounting system can automatically trump the other; the latest change can win; or the user can decide. In one implementation, the conflicting data and any associated data can be displayed and a company can expressly indicate which change should be synchronized.

As described above, the UPM-enabled system allows integration with a buyer's accounting system. Changes made in the buyer's accounting system or in the UPM-enabled system can be synchronized with one another. The UPM-enabled system, however, also allows synchronization with a vendor's accounting system. Accordingly, the UPM-enabled system integrates the entire invoicing process into the accounting systems of both the buyer and the vendor, regardless of their platform, and without the need for the purchase of third party adaptive software. In one implementation, the UPM-enabled system uses synchronization agents on both the buyer's and vendor's computing systems. The UPM-enabled system can send data to the synchronization agent in a known format, e.g., a common data format. For example, the UPM-enabled system can send data that describes a data change, e.g., in XML, field=value format, etc. The synchronization agent can then integrate the data into the existing accounting system. In another implementation, the UPM-enabled system can send the changes to the data in a format that is compatible with the existing accounting system. In this implementation, the synchronization agent can simply pass along the data for integration into the existing accounting system.

In yet another implementation, the synchronization agent can extract accounting data from a software package and convert it to a common data format for transmission across a network to the UPM. A synchronization agent can receive data from the UPM in the common data format and convert the data into a format for use by a specific accounting system. Various accounting systems can easily be supported through the synchronization agents. Because the data is transported in a common data format, data uploaded to the UPM-enabled system from one accounting package can then be downloaded into a completely different accounting package. In a typical scenario, the data synced up from one user's accounting package will be transmitted to another user, who will then have the opportunity to review it and make changes if necessary. In one implementation, once the second user approves the data, it can be synced down into their accounting package, even if it is a different version or different accounting package altogether, from that used by the first user. Often times this will occur by the data being placed into a separate outbound queue, so it can be pulled down by the synchronization agent at a future point in time, although, the process can be automated based on user preference and described in greater detail above. Similarly to how the agent can convert accounting package data to a common data format, it can also write data from the common format back to an accounting package through the same synchronization agent.

The UPM-enabled system can also provide an interface for accessing and managing data from UPM. For example, a web interface or a client program can allow data to be directly input into the UPM-enabled system. This implementation can be used by companies that do not have an electronic accounting system. Accordingly, there is no need to synchronize the data as from the company's perspective there is only a single accounting system, the UPM-enabled system. The company, however, can take full advantage of the features of the UPM-enabled system. In addition, the UPM-enabled system can provide a mobile interface such that mobile devices can easily access data contained with the UPM.

Once a buyer or vendor has synced their accounting data with the UPM, vendors or buyers can quickly and efficiently obtain a snapshot of receivables or payables. In one implementation, the UPM-enabled system allows a vendor and/or buyer to see all of their outstanding invoices, the due date of the invoices, their buyers willingness to pay invoices early, and if so, the applicable discount that would be due. This allows a vendor or buyer to easily see the current cash flow due them, as well as the total amount of funds available for acceleration. For example, vendors can use this data to determine how best to access additional liquidity and how that will impact the vendor's cash flow. As an additional example, a buyer can see all outstanding invoices that are to be paid and determine how best to pay the invoices. The various data can be presented in table format, in an image, in a graphical format, or in a calendar format.

In one implementation, electronic payment can be achieved using ICLs, e.g., a Check 21 compliant process. The UPM-enabled system can determine the accounts associated with paying an invoice. If the UPM-enabled system has an agreement with the vendor's financial institution that allows ICLs, the UPM can create an ICL transaction based upon the one or more invoices to be paid. In this implementation, a buyer is provided with information regarding the payment of invoices. The buyer can select an account to pay the invoices and create a check by affixing their signature and telling the UPM-enabled system to pay the one or more invoices, e.g., by clicking on a pay button. In one implementation, the signature is affixed by the UPM-enabled system after receiving the buyer's instructions to affix their signature. The buyer, therefore, is determining the amount of the payment, the vendor, and the date of payment. The check can then be sent to the UPM-enabled system. In one implementation, the UPM-enabled system can dynamically present an image of the check for the buyer to review, including affixing the buyer's signature, as requested by the buyer. The check can include language indicating that the check is in all respects a legally binding check in compliance with the UCC. In one implementation, the UPM-enabled system can then print and image the check. In another implementation the check is not printed. Once the UPM-enabled system receives the buyer's check, the UPM-enabled system can deliver the check to the vendor via ICL. The UPM-enabled system, through its network of financial institution relationships, can then create an image cash file for submission to the vendor's financial institution. This image cash file can include deposits for numerous vendors of the financial institution. Within the image cash file will be an image cash letter unique to the payments made by the customers of the vendor. Through the ICL process, a payment can flow from the buyer through the UPM-enabled system, directly to the vendor's account, in cleared funds, in as little as minutes.

In one implementation, the image cash file can be uploaded periodically and results in the initiation of transfer of funds between the buyer and the vendor. In another implementation, the file can be sent to the banking institution immediately after the file is generated. Vendors, therefore, receive their payments electronically within minutes or hours instead of days, without the need of paper checks, which must still be deposited to their financial institution prior to accessing the funds. In addition, the vendor's confidential financial account information is protected since it is never disclosed to a buyer. In one implementation, the UPM can be accessed via mobile devices. Accordingly, the buyer can interact with the UPM through a mobile device and initiate payment through a single click via a mobile device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus, such as a processing circuit. A processing circuit such as processor 110 may comprise any digital and/or analog circuit components configured to perform the functions described herein, such as a microprocessor, microcontroller, application-specific integrated circuit, programmable logic, etc. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A check converter credit system comprising:
a universal payment module (UPM) computer;
a data repository electronic storage comprising:
  payee financial accounts and payee financial institutions for a plurality of payees that are registered with a universal payment system;
  data on an ability of respective of the payee financial institutions to receive image cash letter (ICL) credits from the UPM computer and an ability of the payee account at the payee financial institution to receive direct ICL credits;
  payor financial accounts and payor financial institutions for a plurality of payors that are registered to send ICL credits via the UPM computer;
  data for a respective UPM ICL transfer account maintained for receiving ICL credits from the UPM computer in each of multiple of the payee financial institutions, each UPM ICL transfer account for receiving ICL's for multiple different payee accounts; and
  network transfer data for the financial institutions where image cash letter (ICL) credit transfers have been approved for direct ICL credit transfer from the UPM computer to the respective payee financial institutions;
a payor electronic device of a given one of the payors configured to provide or make accessible payor information to a payee electronic device of a given one of the payees for a transaction;
wherein the universal payment module (UPM) computer is configured to:
receive, via a computer network, payor information of the given payor, payee information of the given payee, and transaction information for the given payor and the given payee;
determine, if the given payee and the given payor are registered for UPM credit transfers;
access, via the data repository electronic storage, data for the payor financial institution and the payor account for the given payor;
access, via the data repository electronic storage, data for the payee financial institution and the payee account for the given payee;
transmit a transaction notice for approval to the payor electronic device of the given payor;
receive, via the computer network, from the payor electronic device of the given payor an indication for payment responsive to the transaction notice;
generate a payor check with a check number and an amount, and affix or receive a payor signature for the payor check, or receive a payor check with a payor signature, when it is determined that the payee financial institution is registered to receive image cash letters;
communicate, via the computer network, account information, check data, the amount, and a request to certify the amount to a computer of the payor financial institution of the given payor;
the computer of the payor financial institution of the given payor configured to withdraw funds from the payor account or post the amount to the payor account at the payor financial institution based at least in part on the check data and the request to certify;
wherein the UPM computer is further configured to:
receive, via the computer network, from the payor financial institution computer a notification that a check certification for the amount has occurred for the given payor;
communicate, via the computer network, that the check certification for the amount has occurred for the given payor;
determine whether the payee financial institution of the payee is registered to receive image cash letter (ICL) credits from the UCM computer for the payee account;
create an image cash letter based at least in part on the payor check;
create an image cash file including the image cash letter;
upload the image cash file periodically to the payee financial institution;
process payment to the payee financial institution using the image cash letter;
deposit via transmitting, via the computer network, an image cash letter credit to the payee account of the given payee in the payee financial institution when the payee account can receive direct ICL credits;
deposit in a first electronic deposit step via transmitting, via the computer network, to one of the UPM ICL transfer accounts when direct ICL credit to the payee account of the given payee is not permitted, followed by initiating a second electronic deposit step via an electronic transfer of the amount from the UPM ICL transfer account to the payee account at the payee financial institution of the given payee; and
communicate, via the computer network, to the payor electronic device of the given payor a receipt for the transaction,
wherein the payee financial institution deposits the image cash letter in an account held therein,
wherein the UPM computer is further configured to:
receive, via synchronization with respective payor accounting systems or via a web interface of the universal credit system, electronic notification of payment information comprising dates associated with payments for a plurality of invoices;
indicate, in a synchronization queue, that data changes are available to be synchronized into an accounting system of the given payor;
integrate the data changes indicated as available into the accounting system of the given payor when the given payor approves the synchronization or turns on auto synchronizing capabilities;
compute a hash of material fields in new data;
compare the computed hash with a hash of material fields in data of the accounting system of the given payor;
determine, based on a result of the comparison, whether there is a conflict in values of the material fields between the new data and the accounting system data;
in response to determination that there is a conflict resolve the conflict in the values of the material fields between the new data and the accounting system data and determine resolved values of the material fields; and
integrate the new data into the accounting system of the given payor such that integrated data include both the resolved values of the material fields and values of non-material fields.

2. The system as defined in claim 1, wherein when the first electronic deposit step is performed to the UPM ICL transfer account at a different one of the payee financial institutions, the UPM computer is configured to initiate the second electronic deposit step via an electronic transfer of the amount from the UPM ICL transfer account held at the different payee financial institution to the payee account at the payee financial institution of the given payee.

3. The system as defined in claim 1, wherein when the first electronic deposit step is performed to the UPM ICL transfer account at the payee financial institution of the given payee, the UPM computer is configured for the second electronic deposit step to initiate the electronic transfer of the amount from the UPM ICL transfer account therein to the payee account.

4. The system as defined in claim 1, wherein the UPM computer is configured to receive the payor information, the payee information and the transaction information electronically via the computer network from the payor electronic device for the transaction with the given payee.

5. The system of claim 1, wherein the UPM computer is further configured to:
 determine whether the check is printed;
 print, if it is determined that the check is printed, the check and create the image cash letter using the printed check; and
 create, if it is determined that the check is not printed, the image cash letter to be included in the image cash file.

6. A non-transitory computer-readable medium comprising computer-readable code for execution by a universal payment module (UPM) computer, for converting a check within a universal payment system to have an ATM-like effect, comprising:
 computer-readable code to receive, by a universal payment module (UPM) computer, via a computer network, payor information of a given payor, payee information of a given payee and transaction information for the given payor and the given payee;
 computer-readable code to determine, by the UPM computer, if the given payee and the given payor are registered for UPM credit transfers via access to a data repository electronic storage comprising:
  payee financial accounts and payee financial institutions for a plurality of payees that are registered with the universal payment system;
  data on an ability of respective of the payee financial institutions to receive image cash letter (ICL) credits from the UPM computer and an ability of the payee account at the payee financial institution to receive direct ICL credits;
  payor financial accounts and payor financial institutions for a plurality of payors that are registered to send ICL credits via the UPM computer;
  data for a respective UPM ICL transfer account maintained for receiving ICL credits from the UPM computer in each of multiple of the payee financial institutions, each UPM ICL transfer account for receiving ICL's for multiple different payee accounts; and
  network transfer data for the financial institutions where image cash letter (ICL) credit transfers have been approved for direct ICL credit transfer from the UPM computer to the respective payee financial institutions;
 computer-readable code to access, by the UPM computer via the data repository electronic storage, data for the payor financial institution and the payor account for the given payor;
 computer-readable code to access, by the UPM computer via the data repository electronic storage, data for the payee financial institution and the payee account for the given payee;
 computer-readable code to transmit, by the UPM computer, a transaction notice for approval to a payor electronic device of the given payor;
 computer-readable code to receive, by the UPM computer, via the computer network, from the payor electronic device of the given payor an indication for payment responsive to the transaction notice;
 computer-readable code to generate, by the UPM computer, a payor check with a check number and an amount, and affix or receive a payor signature for the payor check, or receive a payor check with a payor signature, when it is determined that the payee financial institution is registered to receive image cash letters;
 computer-readable code to communicate, by the UPM computer, via the computer network, account information, check data, the amount, and a request to certify the amount to a computer of the payor financial institution of the given payor;
 computer-readable code to receive, by the UPM computer, via the computer network, from the computer of the payor financial institution a notification that a check certification for the amount has occurred for the given payor;
 computer-readable code to communicate, by the UPM computer, via the computer network, that the check certification for the amount has occurred for the given payor;
 computer-readable code to determine, by the UPM computer, whether the payee financial institution of the payee is registered to receive image cash letter (ICL) credits from the UCM computer for the payee account;
 computer-readable code to create, by the UPM computer, an image cash letter based at least in part on the payor check;
 computer-readable code to create, by the UPM computer, an image cash file including the image cash letter;
 computer-readable code to upload, by the UPM computer, the image cash file periodically to the payee financial institution;
 computer-readable code to process, by the UPM computer, payment to the payee financial institution using the image cash letter;
 computer-readable code to deposit via transmitting, by the UPM computer, via the computer network, an image cash letter credit to the payee account of the given payee in the payee financial institution when the payee account can receive direct ICL credits;
 computer-readable code to deposit in a first electronic deposit step via transmitting, by the UPM computer, via the computer network, to one of the UPM ICL transfer accounts when direct ICL credit to the payee account of the given payee is not permitted, followed by initiating a second electronic deposit step via an electronic transfer of the amount from the UPM ICL transfer account to the payee account at the payee financial institution of the given payee;
 computer-readable code to communicate, by the UPM computer, via the computer network, to the payor electronic device of the given payor a receipt for the transaction;
 computer-readable code to receive, by the UPM computer via synchronization with respective payor accounting systems or via a web interface of the universal credit system, electronic notification of payment information comprising dates associated with payments for a plurality of invoices;

computer-readable code to indicate, by the UPM computer in a synchronization queue, that data changes are available to be synchronized into an accounting system of the given payor;

computer-readable code to integrate the data changes indicated as available into the accounting system of the given payor when the given payor approves the synchronization or turns on auto synchronizing capabilities;

computer-readable code to compute, by the UPM computer, a hash of material fields in new data;

computer-readable code to compare, by the UPM computer, the computed hash with a hash of material fields in data of the accounting system of the given payor;

computer-readable code to determine, by the UPM computer, based on a result of the comparison, whether there is a conflict in values of the material fields between the new data and the accounting system data;

computer-readable code to, in response to determination that there is a conflict, resolve the conflict in the values of the material fields between the new data and the accounting system data and determine resolved values of the material fields; and computer-readable code to integrate the new data into the accounting system of the given payor such that integrated data include both the resolved values of the material fields and values of non-material fields.

7. The non-transitory computer-readable medium as defined in claim 6, wherein when the first electronic deposit step is performed to the UPM ICL transfer account at a different payee financial institution, the computer-readable code for the second electronic deposit step electronically causes the electronic transfer of the amount from the UPM ICL transfer account held at the different one of the payee financial institutions to the payee account at the payee financial institution of the given payee.

8. The non-transitory computer-readable medium as defined in claim 6, wherein when the first electronic deposit step is performed to the UPM ICL transfer account at the payee financial institution of the given payee, the computer-readable code for the second electronic deposit step causes the electronic transfer of the amount from the UPM ICL transfer account at the financial institution of the given payee to the payee account therein.

9. The non-transitory computer-readable medium of claim 6, further comprising:

computer-readable code to determine, by the UPM computer, whether the check is printed;

computer-readable code to print, by the UPM computer, if it is determined that the check is printed, the check and create the image cash letter using the printed check; and computer-readable code to create, by the UPM computer, if it is determined that the check is not printed, the image cash letter to be included in the image cash file.

\* \* \* \* \*